United States Patent
Lee et al.

(10) Patent No.: US 12,108,294 B2
(45) Date of Patent: Oct. 1, 2024

(54) METHOD AND APPARATUS FOR CELL RESELECTION IN WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 400 days.

(21) Appl. No.: 17/608,730

(22) PCT Filed: Jul. 22, 2020

(86) PCT No.: PCT/KR2020/009661
§ 371 (c)(1),
(2) Date: Nov. 3, 2021

(87) PCT Pub. No.: WO2021/015553
PCT Pub. Date: Jan. 28, 2021

(65) Prior Publication Data
US 2022/0322182 A1   Oct. 6, 2022

(30) Foreign Application Priority Data

Jul. 22, 2019 (KR) .................. 10-2019-0088557

(51) Int. Cl.
*H04W 76/30* (2018.01)
*H04W 36/00* (2009.01)
*H04W 36/08* (2009.01)

(52) U.S. Cl.
CPC ....... *H04W 36/08* (2013.01); *H04W 36/0061* (2013.01); *H04W 76/30* (2018.02)

(58) Field of Classification Search
CPC . H04W 36/08; H04W 36/30; H04W 36/0061; H04W 76/30; H04W 76/27;
(Continued)

(56) References Cited

U.S. PATENT DOCUMENTS

2007/0270148 A1   11/2007   Yeh et al.
2009/0238117 A1*   9/2009   Somasundaram ... H04J 11/0093
                                                            370/328
(Continued)

FOREIGN PATENT DOCUMENTS

KR   10-0703269 B1   4/2007

OTHER PUBLICATIONS

"3rd Generation Partnership Project; Technical Specification Group Radio Access Network; NR; User Equipment (UE) procedures in Idle mode and RRC Inactive state (Release 15)", 3GPP TS 38.304 V15.4.0, Jun. 29, 2019, pp. 1-29.

(Continued)

*Primary Examiner* — Wei Zhao
(74) *Attorney, Agent, or Firm* — BRYAN CAVE LEIGHTON PAISNER LLP

(57) ABSTRACT

The present disclosure relates to a cell reselection in wireless communications. According to an embodiment of the present disclosure, a method performed by a wireless device in a wireless communication system, the method comprises: receiving a connection release message from a network upon which the wireless device leaving a connected state; receiving a configuration of a threshold range from the network; receiving information for identities (IDs) of higher priority cells from the network; identifying a highest ranked cell among a plurality of neighbor cells based on a result of a measurement on the plurality of neighbor cells; identifying one or more neighbor cells among the plurality of neighbor cells whose ranking value is within the threshold range of a (Continued)

ranking value of the highest ranked cell; and performing a cell reselection to a cell among the one or more neighbor cells based on that an ID of the cell is included in the IDs of higher priority cells.

14 Claims, 16 Drawing Sheets

(58) Field of Classification Search
CPC ..... H04W 76/28; H04W 76/11; H04W 68/02; H04W 36/006
See application file for complete search history.

(56) References Cited

U.S. PATENT DOCUMENTS

| | | | |
|---|---|---|---|
| 2019/0174571 A1* | 6/2019 | Deenoo | H04W 36/30 |
| 2019/0357065 A1* | 11/2019 | Cho | H04W 24/10 |

OTHER PUBLICATIONS

Intel Corporation, "RAN2 impact on Non-Public Network Deployment using SNPN", R2-1900760, 3GPP TSG RAN WG2 Meeting #105, Athens, Greece, Feb. 25-Mar. 1, 2019, pp. 1-5.

LG Electronics Inc., "Considerations on camping on non-best cell", R2-1908005, 3GPP TSG-RAN2 Meeting #105bis, Reno, USA, May 13-17, 2019, pp. 1-2.

* cited by examiner

METHOD AND APPARATUS FOR CELL RESELECTION IN WIRELESS COMMUNICATION SYSTEM This application is the National Stage filing under 35 U.S.C. 371 of International Application No. PCT/KR2020/009661, filed on Jul. 22, 2020, which claims the benefit of and priority to Korean Application No. 10-2019-0088557, filed on Jul. 22, 2019, the contents of which are all hereby incorporated by reference herein in their entirety.

BACKGROUND OF THE DISCLOSURE

Field of the Disclosure

The present disclosure relates to a cell reselection in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In various situations in wireless communications, a UE may need to perform a cell reselection to a neighbor cell since the UE moves along various areas. To reselect a cell, the UE should perform a measurement on neighbor cells, and select a cell among them to perform a cell reselection based on the measurement result. The UE may need to reselect a proper cell based on certain criteria so that the UE be provided with a service of good quality from the reselected cell.

SUMMARY OF THE DISCLOSURE

Technical Problem

An aspect of the present disclosure is to provide method and apparatus for cell reselection in a wireless communication system.

Another aspect of the present disclosure is to provide method and apparatus for cell reselection in multi-beam operations.

Another aspect of the present disclosure is to provide method and apparatus for cell reselection to a cell among neighbor cells including higher priority cells (e.g., non-public network (NPN) cells) in a wireless communication system.

Another aspect of the present disclosure is to provide method and apparatus for performing a cell reselection to a higher priority cell in multi-beam operations in a wireless communication system.

Technical Solution

According to an embodiment of the present disclosure, a method performed by a wireless device in a wireless communication system, the method comprises: receiving a connection release message from a network upon which the wireless device leaving a connected state; receiving a configuration of a threshold range from the network; receiving information for identities (IDs) of higher priority cells from the network; identifying a highest ranked cell among a plurality of neighbor cells based on a result of a measurement on the plurality of neighbor cells; identifying one or more neighbor cells among the plurality of neighbor cells whose ranking value is within the threshold range of a ranking value of the highest ranked cell; and performing a cell reselection to a cell among the one or more neighbor cells based on that an ID of the cell is included in the IDs of higher priority cells.

According to an embodiment of the present disclosure, a wireless device in a wireless communication system comprises: a transceiver; a memory; and at least one processor operatively coupled to the transceiver and the memory, and configured to: control the transceiver to receive a connection release message from a network upon which the wireless device leaving a connected state, control the transceiver to receive a configuration of a threshold range from the network, control the transceiver to receive information for identities (IDs) of higher priority cells from the network, identify a highest ranked cell among a plurality of neighbor cells based on a result of a measurement on the plurality of neighbor cells, identify one or more neighbor cells among the plurality of neighbor cells whose ranking value is within the threshold range of a ranking value of the highest ranked cell, and perform a cell reselection to a cell among the one or more neighbor cells based on that an ID of the cell is included in the IDs of higher priority cells.

According to an embodiment of the present disclosure, a processor for a wireless device in a wireless communication system is configured to control the wireless device to perform operations comprising: receiving a connection release message from a network upon which the wireless device leaving a connected state; receiving a configuration of a threshold range from the network; receiving information for identities (IDs) of higher priority cells from the network; identifying a highest ranked cell among a plurality of neighbor cells based on a result of a measurement on the plurality of neighbor cells; identifying one or more neighbor cells among the plurality of neighbor cells whose ranking value is within the threshold range of a ranking value of the highest ranked cell; and performing a cell reselection to a cell among the one or more neighbor cells based on that an ID of the cell is included in the IDs of higher priority cells.

According to an embodiment of the present disclosure, a computer-readable medium having recorded thereon a program for performing each step of a method on a computer is provided. The method comprises: receiving a connection release message from a network upon which the wireless device leaving a connected state; receiving a configuration of a threshold range from the network; receiving information for identities (IDs) of higher priority cells from the network; identifying a highest ranked cell among a plurality of neighbor cells based on a result of a measurement on the plurality of neighbor cells; identifying one or more neighbor cells among the plurality of neighbor cells whose ranking value is within the threshold range of a ranking value of the highest ranked cell; and performing a cell reselection to a cell among the one or more neighbor cells based on that an ID of the cell is included in the IDs of higher priority cells.

According to an embodiment of the present disclosure, a method performed by a base station in a wireless communication system comprises: transmitting a connection release message to a wireless device upon which the wireless device leaving a connected state; transmitting a configuration of a threshold range to the wireless device; and transmitting, to the wireless device, information for identities (IDs) of higher priority cells, wherein the wireless device is configured to: identify a highest ranked cell among a plurality of neighbor cells based on a result of a measurement on the plurality of neighbor cells; identify one or more neighbor cells among the plurality of neighbor cells whose ranking value is within the threshold range of a ranking value of the highest ranked cell; and perform a cell reselection to a cell among the one or more neighbor cells based on that an ID of the cell is included in the IDs of higher priority cells.

According to an embodiment of the present disclosure, a base station in a wireless communication system comprises: a transceiver; a memory; and at least one processor operatively coupled to the transceiver and the memory, and configured to: control the transceiver to transmit a connection release message to a wireless device upon which the wireless device leaving a connected state, control the transceiver to transmit configuration of a threshold range to the wireless device, and control the transceiver to transmit, to the wireless device, information for identities (IDs) of higher priority cells, wherein the wireless device is configured to: identify a highest ranked cell among a plurality of neighbor cells based on a result of a measurement on the plurality of neighbor cells; identify one or more neighbor cells among the plurality of neighbor cells whose ranking value is within the threshold range of a ranking value of the highest ranked cell; and perform a cell reselection to a cell among the one or more neighbor cells based on that an ID of the cell is included in the IDs of higher priority cells.

Advantageous Effect

The present disclosure can have various advantageous effects.

For example, the wireless device may perform cell reselection to an NPN cell in multi-beam operation in idle/inactive mode, even if R value of the NPN cell is within a threshold range (i.e., rangeToBestCell) from the R value of the highest ranked cell but the number of beams above a threshold value (i.e., absThreshSS-BlocksConsolidation-) for the NPN cell is not the highest.

For example, the UE can camp on the higher priority cell (e.g., NPN cell) among the cells in the best cell group of a frequency, even if the higher priority cell does not have the highest cell quality value or the highest number of good beams in the best cell group. The member of the best cell group may be determined by measured cell quality value of each cell. For example, the best cell group may comprise, among neighbour cells on which a measurement is performed, i) the highest ranked cell (i.e., the cell having the highest cell quality value), and ii) one or more neighbour cells whose cell quality value is within a configured threshold range (e.g., rangeToBestCell) from the cell quality value of the highest ranked cell. To distinguish the higher priority cell, the UE may compare the cell identity of a cell with the list of higher priority cells received from a network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
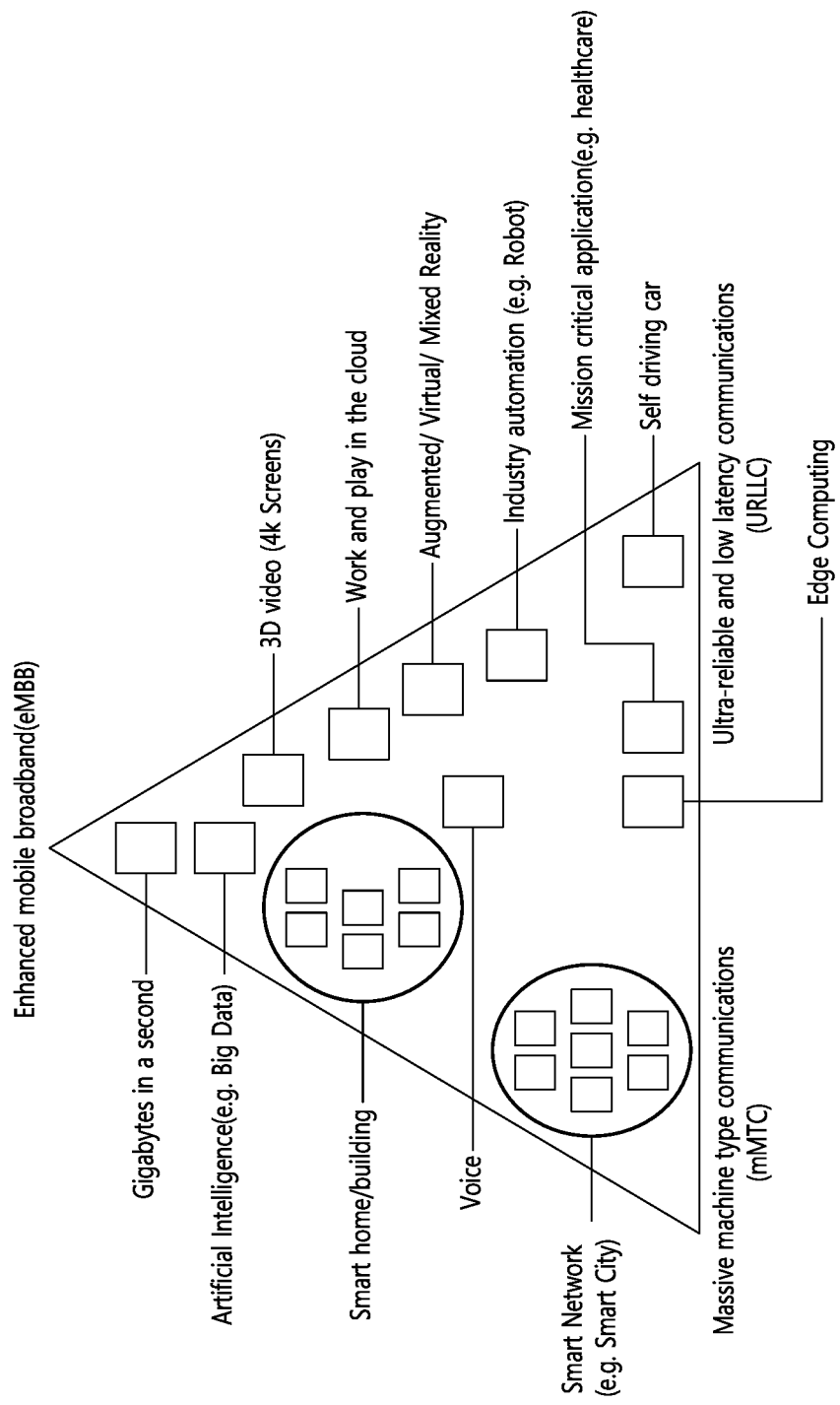
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-1-DMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

Any cell selection state: In the any cell selection state, a UE shall perform cell selection process to find a suitable cell. If the cell selection process fails to find a suitable cell after a complete scan of all RATs and all frequency bands supported by the UE, the UE shall attempt to find an acceptable cell of any PLMN to camp on, trying all RATs that are supported by the UE and searching first for a high-quality cell. The UE, which is not camped on any cell, shall stay in the any cell selection state. The any cell selection state may be applicable for RRC_IDLE and RRC_INACTIVE state.

Camped on any cell state: The camped on any cell state may be applicable for RRC_IDLE state. In the camped on any cell state, the UE may be in idle mode and has completed the cell selection/reselection process, and has chosen a cell irrespective of PLMN identity.

In the camped on any cell state, the UE shall perform the following tasks:
monitor short Messages transmitted with P-RNTI over DCI;
monitor relevant system information;
perform necessary measurements for the cell reselection evaluation procedure;
execute the cell reselection evaluation process;
regularly attempt to find a suitable cell trying all frequencies of all RATs that are supported by the UE. If a suitable cell is found, UE shall move to camped normally state.
if the UE supports voice services and the current cell does not support IMS emergency calls as indicated by the field ims-EmergencySupport in SIB1, the UE shall perform cell selection/reselection to an acceptable cell that supports emergency calls in any supported RAT regardless of priorities provided in system information from current cell, if no suitable cell is found.

"Acceptable cell" refers to a cell on which the UE may camp to obtain limited service (originate emergency calls and receive ETWS and CMAS notifications). Such a cell shall fulfil the requirements that i) the cell is not barred, and ii) the cell selection criteria are fulfilled. The requirements may be the minimum set of requirements to initiate an emergency call and to receive ETWS and CMAS notification in a network.

"Suitable cell" refers to a cell on which a UE may camp. For example, a cell may be considered as suitable if the following conditions are fulfilled:
The cell is part of either the selected PLMN or the registered PLMN or PLMN of the equivalent PLMN list;
The cell selection criteria are fulfilled;
The cell is not barred according to the latest information provided by NAS;
The cell is part of at least one TA that is not part of the list of "Forbidden Tracking Areas", which belongs to either the selected PLMN or the registered PLMN or PLMN of the equivalent PLMN list.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| R1 | 450 MHz-6000 MHz | 15, 30, 60 kHz |
| R2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| R1 | 410 MHz-7125 Hz | 15, 30, 60 kHz |
| R2 | 24250 MHz-52600 Hz | 60, 120, 240 kHz |

Figure 2:
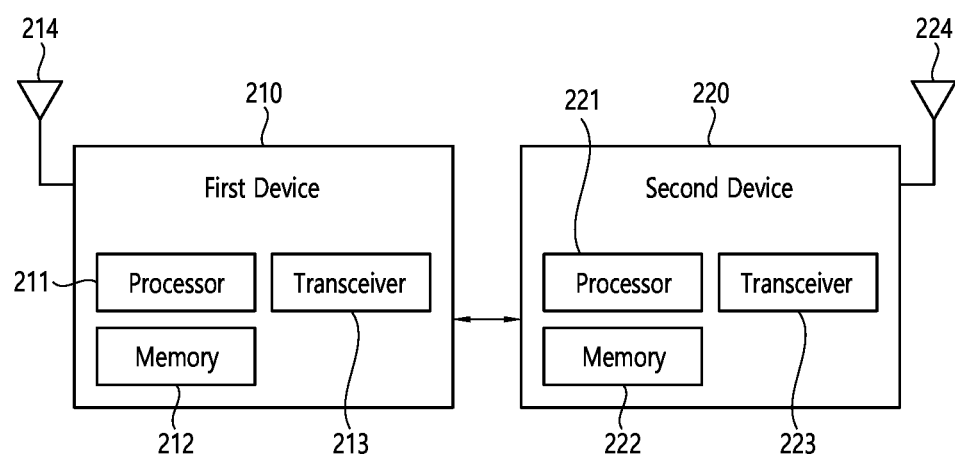
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
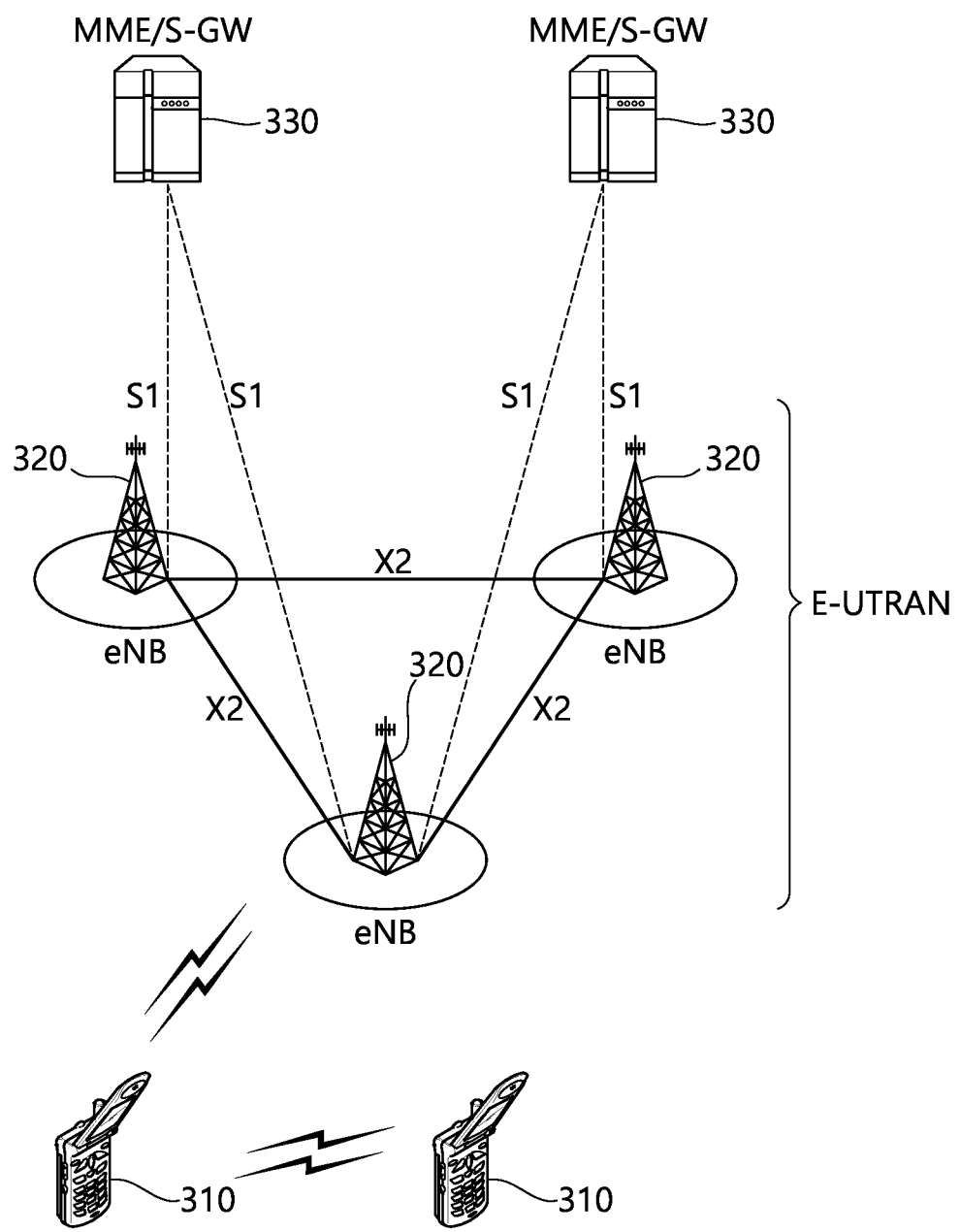
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
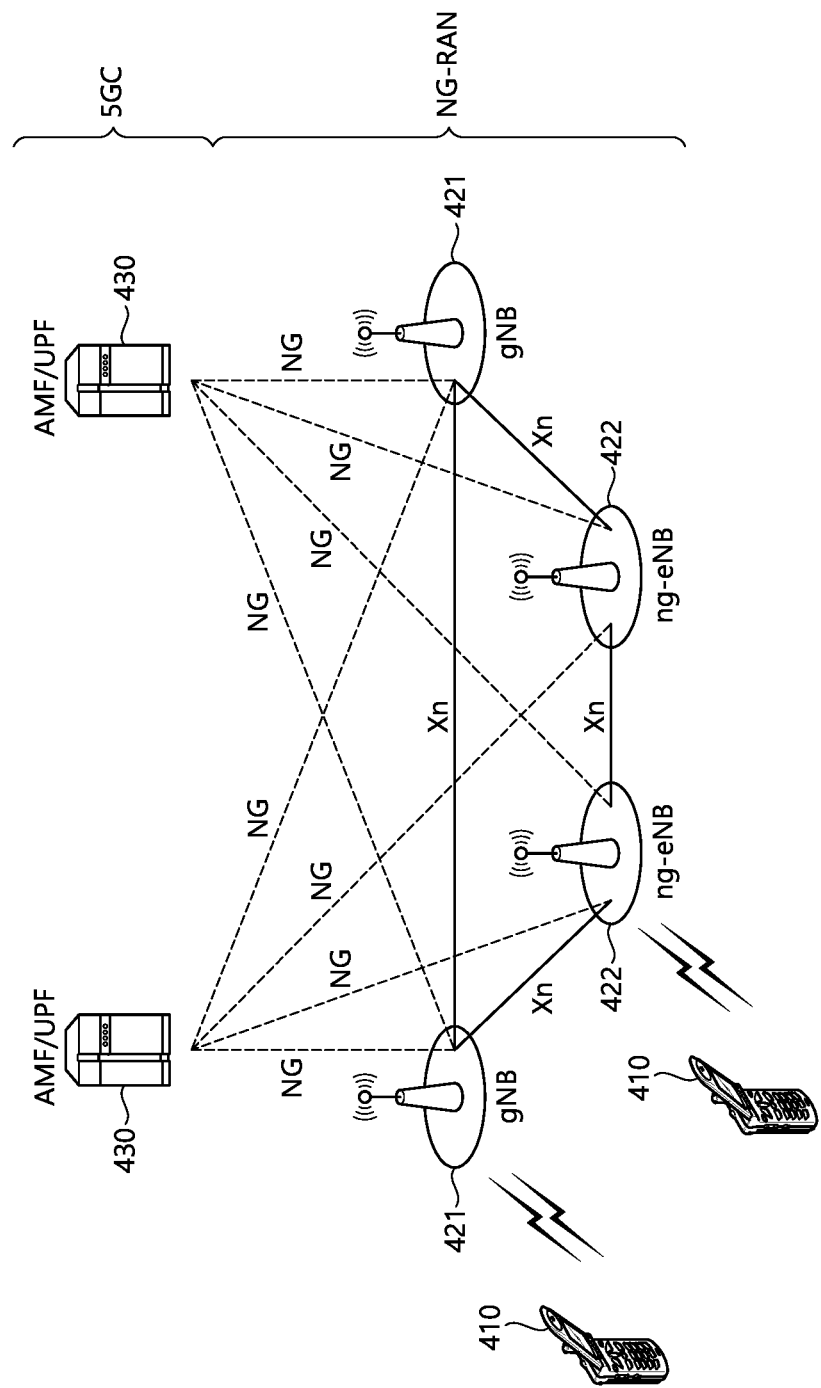
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
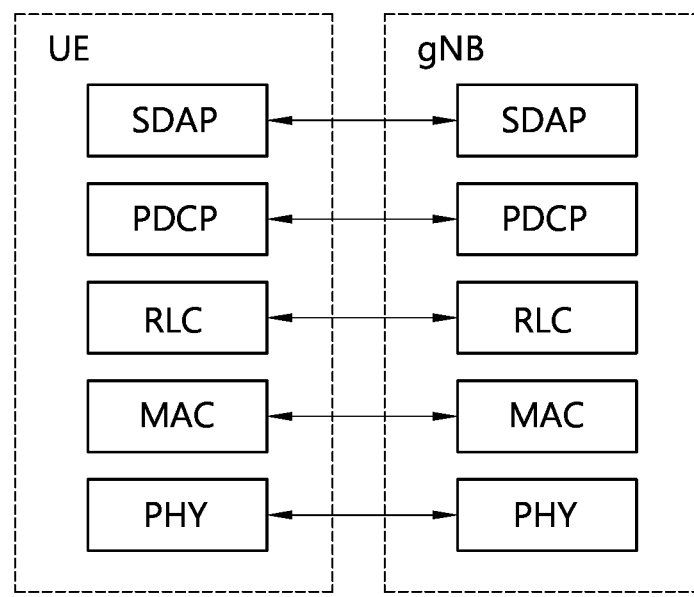
FIG. 5 shows a block diagram of a user plane protocol stack to which the technical features of the present disclosure can be applied.
Figure 6:
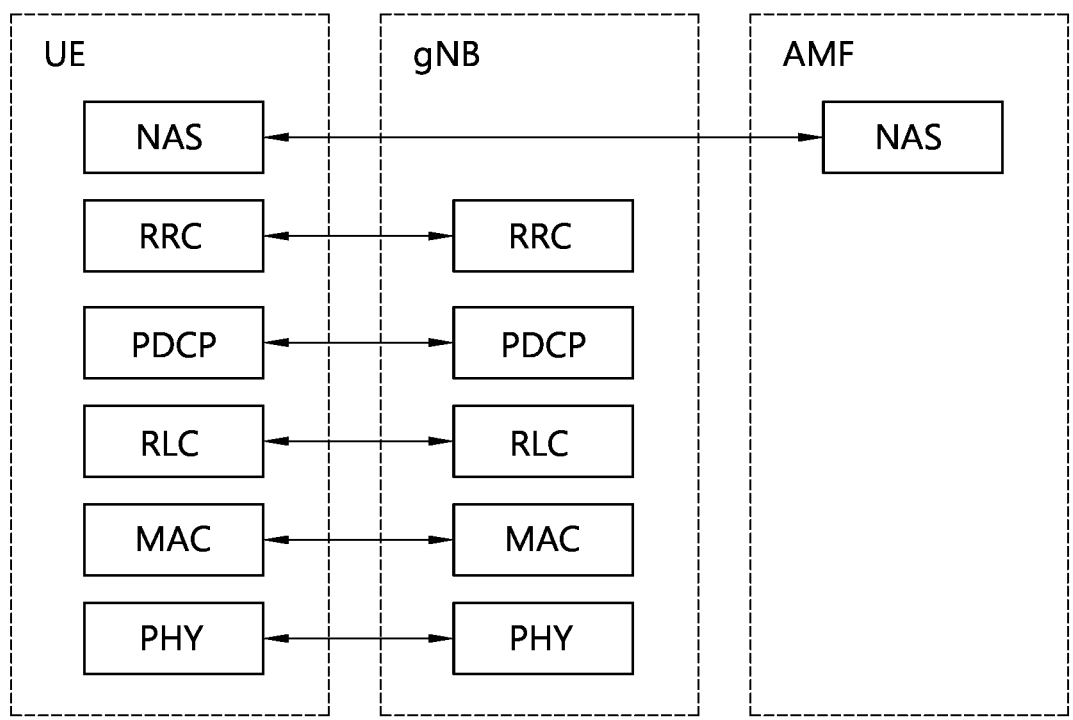
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell reselection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
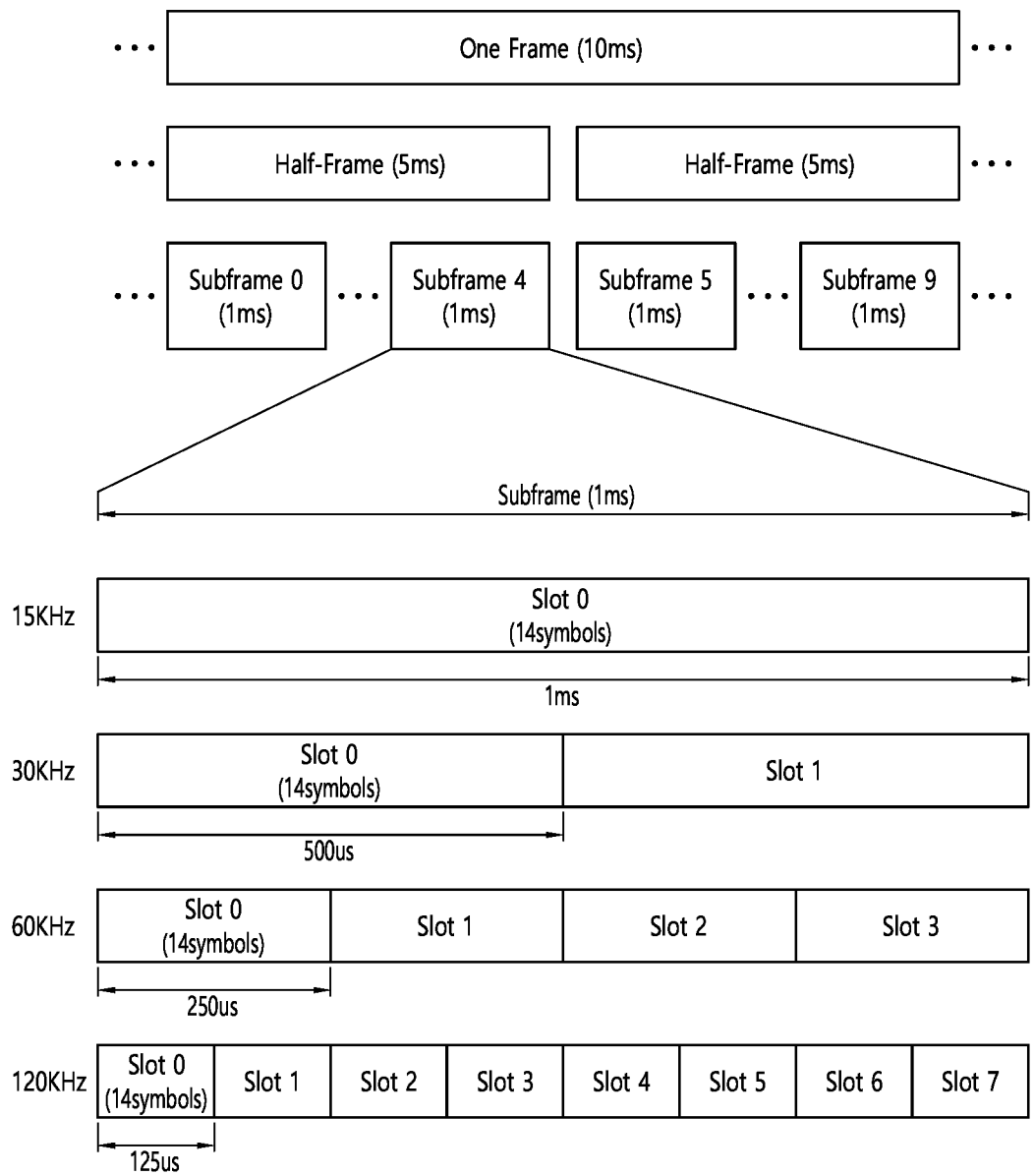
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz. The following table shows the number of OFDM symbols per slot, the number of slots per frame, and the number of slots per for the normal CP, according to the subcarrier spacing $\Delta f = 2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid,x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
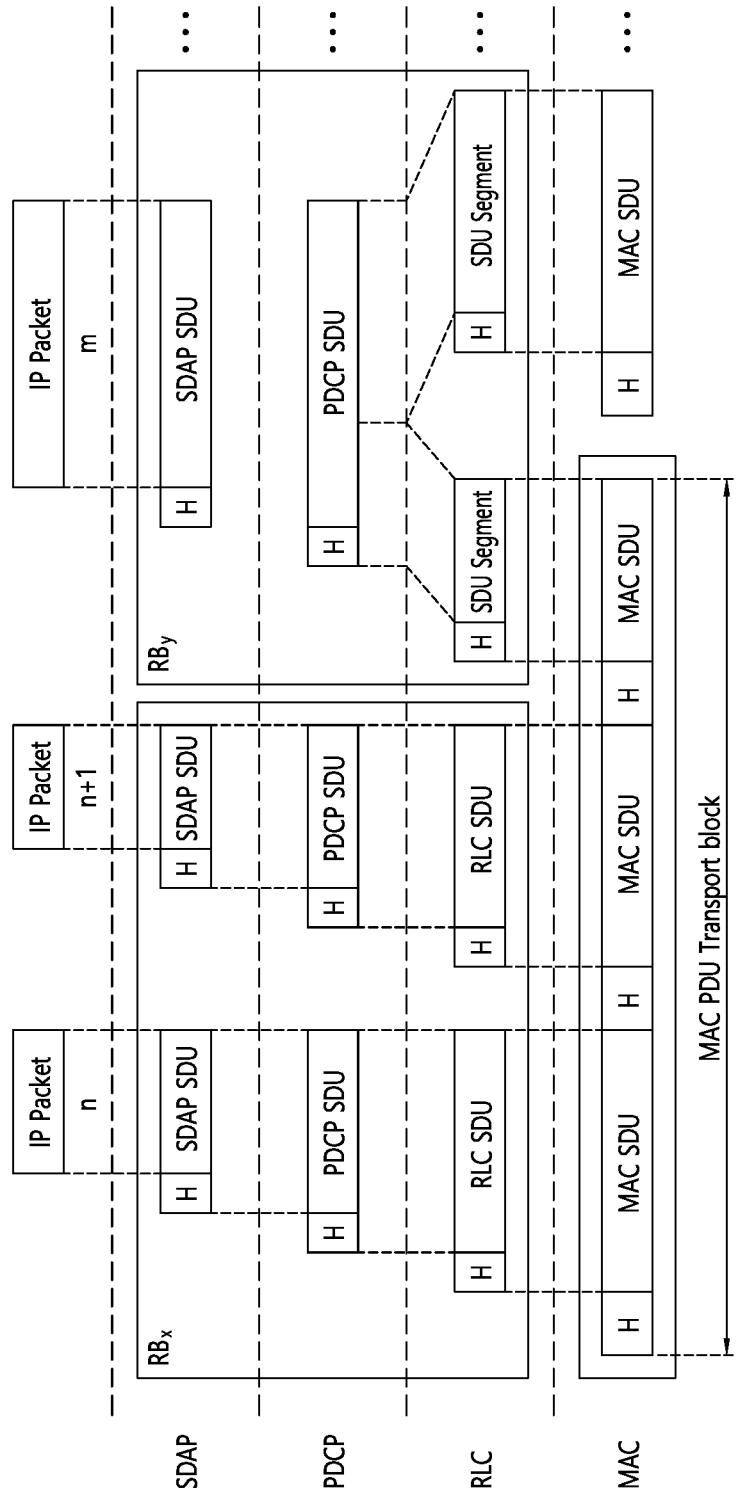
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
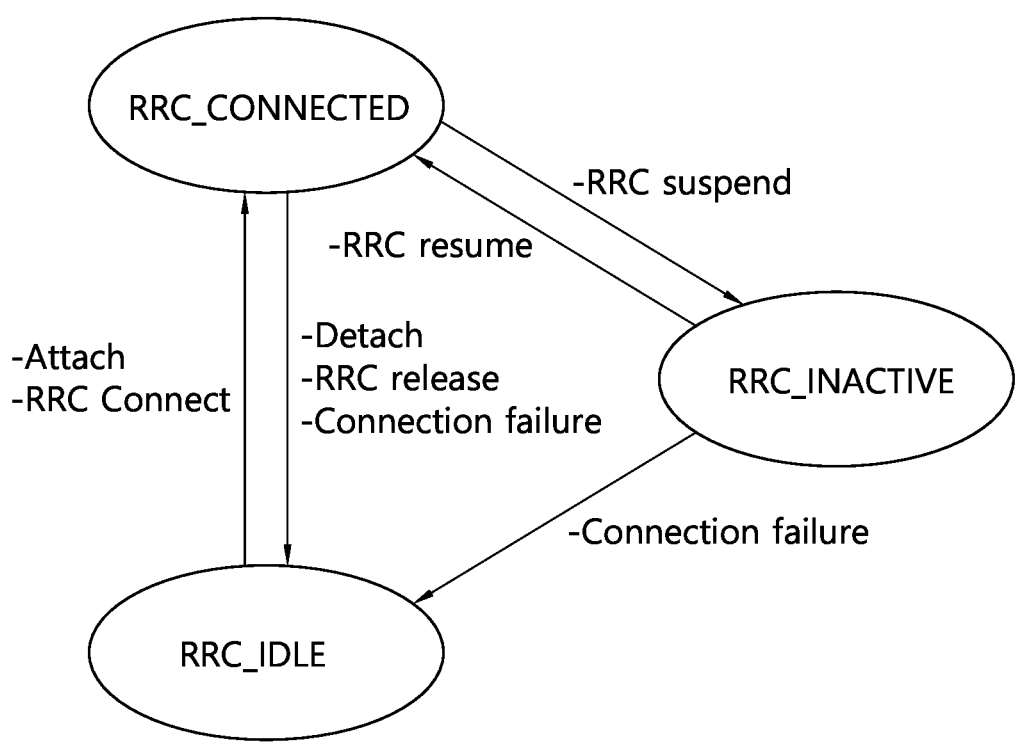
FIG. 9 shows an example of possible RRC states in a wireless communication system to which technical features of the present disclosure can be applied.

FIG. 9 shows an example of possible RRC states in a wireless communication system to which technical features of the present disclosure can be applied.

Referring to FIG. 9, there may be 3 possible RRC states in a wireless communication system (i.e., RRC_IDLE, RRC_CONNECTED and/or RRC_IDLE).

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell-radio network temporary identifier (C-RNTI) for signallings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also be kept for the UE, the UE may fast transit to a connected state for data transfer. In the transition, core network signalling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INCATIVE may be construed as a mix of the idle state and the connected state.

As illustrated in FIG. 9, the UE may transit to RRC_CONNECTED from RRC_IDLE by performing initial attach procedure or RRC connection establishment procedure. The UE may transit to RRC_IDLE from RRC_CONNECTED when detach, RRC connection release and/or connection failure (e.g., radio link failure (RLF)) has occurred. The UE may transit to RRC_INACTIVE from RRC_INACTIVE when RRC connection is suspended, and transit to RRC_CONNECTED from RRC_INACTIVE when RRC connection is resume. The UE may transit to RRC_IDLE from RRC_INACTIVE when connection failure such as RLF has occurred.

Hereinafter, cell selection criterion is described.

The cell selection criterion S (or, simply S criterion/criteria) may be fulfilled if the equation "Srxlev>0 AND Squal>0" is satisfied. The Srxlev may be defined based on the equation $Srxlev = Q_{rxlevmeas} - (Q_{rxlevmin} + Q_{rxlevminoffset}) - P_{compensation} - Qoffset_{temp}$, and the Squal may be defined based on the equation $Sqaul = Q_{qualmeas} - (Q_{qualmin} + Q_{qualminoffset}) - Q_{offsettemp}$. Parameters related to the above stated equations may be defined as Table 5 below:

TABLE 5

| | |
|---|---|
| Srxlev | Cell selection RX level value (dB) |
| Squal | Cell selection quality value (dB) |
| $Qoffset_{temp}$ | Offset temporarily applied to a cell (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB 1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{rxlevminoffsetcell}$ is signalled for the concerned cell, this cell specific offset is added to achieve the required minimum quality level in the concerned cell. |
| $Q_{rxlevminoffse}$ | Offset to the signalled $Q_{rxlevmin}$ taken into account in the Srxlev evaluation as a result of a periodic search for a higher priority PLMN while camped normally in a VPLMN. |
| $Q_{qualminoffset}$ | Offset to the signalled $Q_{qualmin}$ taken into account in the Squal evaluation as a result of a periodic search for a higher priority PLMN while camped normally in a VPLMN. |
| $P_{compensation}$ | For FR1, if the UE supports the additionalPmax in the NR-NS-PmaxList, if present, in SIB1, SIB2 and SIB4: $max(P_{EMAX1} - P_{PowerClass}, 0) - (min(P_{EMAX2}, P_{PowerClass}) - min(P_{EMAX1}, P_{PowerClass}))$ (dB); else: $max(P_{EMAX1} - P_{PowerClass}, 0)$ (dB) For PR2, $P_{compensation}$ is set to 0. |
| $P_{EMAX1}$, $P_{EMAX2}$ | Maximum TX power level of a UE may use when transmitting on the uplink in the cell (dBm). If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4. else $P_{EMAX1}$ and $P_{EMAX2}$ are obtained from the p-Max and NR-NS-PmaxList respectively in SIB1, SIB2 and SIB4 for normal UL. |
| $P_{PowerClass}$ | Maximum RF output power of the UE (dBm) according to the UE power class. |

The signalled values $Q_{rxlevminoffset}$ and $Q_{qualminoffset}$ may only be applied when a cell is evaluated for a cell selection as a result of a periodic search for a higher priority PLMN while camped normally in a VPLMN. During this periodic search for higher priority PLMN, the UE may check the S criteria of a cell using parameter values stored from a different cell of this higher priority PLMN. Hereinafter, cell reselection in multi-beam operations is described.

For cell reselection in multi-beam operations, a measurement quantity of a cell may be derived amongst beams corresponding to/associated with the cell based on SS/PBCH block as follows:

1> if nrofSS-BlocksToAverage is not configured in system information block (SIB) type 2 (SIB2); or
1> if absThreshSS-BlocksConsolidation is not configured in SIB2; or
1> if the highest beam measurement quantity value is below or equal to absThreshSS-BlocksConsolidation:
2> derive a cell measurement quantity as the highest beam measurement quantity value.
1> else:
2> derive a cell measurement quantity as the linear average of the power values of up to nrofSS-Blocks-ToAverage of highest beam measurement quantity values above absThreshSS-BlocksConsolidation.

The parameter nrofSS-BlocksToAverage may indicate the number of SSBs to average for a cell measurement derivation.

The parameter absThreshSS-BlocksConsolidation may indicate a threshold for a consolidation of layer 1 (L1) measurements per reference signal (RS) index and/or beam index.

Hereinafter, cell reselection criteria is described. The cell reselection criteria may comprise intra-frequency cell reselection criteria and/or inter-frequency cell reselection criteria with equal priority.

For the cell reselection criteria, cell-ranking criterion R (or, simply R criterion/criteria) may be used. The ranking value that is determined according to the cell-ranking criterion R may be referred to as R value.

The cell-ranking criterion $R_s$ for serving cell may be defined by the equation $R_s = Q_{meas,s} + Q_{hyst} - Qoffset_{temp}$, and the cell-ranking criterion $R_n$ for neighboring cells may be defined by the $R_n = Q_{meas,n} - Q_{offset} - Qoffset_{temp}$. Parameters related to the above stated equations may be defined as Table 6 below:

TABLE 6

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell. |

The UE shall perform ranking of all cells that fulfil the cell selection criterion S. The cells shall be ranked according to the R criteria specified above by deriving $Q_{meas,n}$ and $Q_{meas,s}$, and calculating the R values using averaged RSRP results. If rangeToBestCell is not configured, the UE shall perform cell reselection to the highest ranked cell. In contrast, if rangeToBestCell is configured, then the UE shall perform cell reselection to the cell with the highest number of beams above the threshold (i.e., absThreshSS-Blocks-Consolidation) among the cells whose R value is within rangeToBestCell of the R value of the highest ranked cell. Throughout the disclosure, a beam above the threshold (i.e., a beam whose quality/beam quality/RSRP is above the threshold) may be referred to as 'good beam'. That is, if rangeToBestCell is configured, then the UE shall perform cell reselection to the cell with the highest number of good beams among the cells whose R value is within rangeToBestCell of the R value of the highest ranked cell. If there are multiple such cells, the UE shall perform cell reselection to the highest ranked cell among them.

In all cases, the UE shall reselect the new cell, only if i) the new cell is better than the serving cell according to the cell reselection criteria specified above during a time interval $Treselection_{RAT}$; and ii) more than 1 second has elapsed since the UE camped on the current serving cell. Herein, the $Treselection_{RAT}$ may specify the cell reselection timer value. For each target NR frequency and for each RAT other than NR, a specific value for the cell reselection timer may be defined, which is applicable when evaluating reselection within NR or towards other RAT (i.e., $Treselection_{RAT}$ for NR is $Treselection_{NR}$, for E-UTRAN $Treselection_{EUTRA}$).

Hereinafter, NR inter-frequency and inter-RAT cell reselection criteria is described.

If a threshold value "threshServingLowQ" is broadcast in system information and more than 1 second has elapsed since the UE camped on the current serving cell, cell reselection to a cell on a higher priority NR frequency or inter-RAT frequency than the serving frequency shall be performed if a cell of a higher priority NR or EUTRAN RAT/frequency fulfils $Squal > Thresh_{X, HighQ}$ during a time interval $Treselection_{RAT}$.

Otherwise, cell reselection to a cell on a higher priority NR frequency or inter-RAT frequency than the serving frequency shall be performed if:

A cell of a higher priority RAT/frequency fulfils $Srxlev > Thresh_{X, HighP}$ during a time interval $Treselection_{RAT}$; and More than 1 second has elapsed since the UE camped on the current serving cell.

Cell reselection to a cell on an equal priority NR frequency shall be based on ranking for intra-frequency cell reselection, as described above.

If threshServingLowQ is broadcast in system information and more than 1 second has elapsed since the UE camped on the current serving cell, cell reselection to a cell on a lower priority NR frequency or inter-RAT frequency than the serving frequency shall be performed if the serving cell fulfils $Squal < Thresh_{Serving, LowQ}$ and a cell of a lower priority NR or E-UTRAN RAT/frequency fulfils $Squal > Thresh_{X, LowQ}$ during a time interval $Treselection_{RAT}$.

Otherwise, cell reselection to a cell on a lower priority NR frequency or inter-RAT frequency than the serving frequency shall be performed if:

The serving cell fulfils $Srxlev < Thresh_{Serving, LowP}$ and a cell of a lower priority RAT/frequency fulfils $Srxlev > Thresh_{X, LowP}$ during a time interval $Treselection_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, the UE shall reselect the highest ranked cell among the cells on the highest priority frequency(ies) meeting the criteria.

If the highest-priority frequency is from another RAT, the UE shall reselect the highest ranked cell among the cells on the highest priority frequency(ies) meeting the criteria of that RAT.

In various embodiments, the parameter "csg-PhysCellId-Range" may be broadcast in system information. For example, a UE may receive a system information block type 4 (SIB4) comprising the csg-PhysCellIdRange that is broadcast by a network. The csg-PhysCellIdRange may specify a set of physical cell identities reserved for closed subscriber group (CSG) cells on the frequency on which the csg-PhysCellIdRange was received. The received csg-PhysCellIdRange may apply if less than 24 hours has elapsed since the csg-PhysCellIdRange was received and the UE is camped on a cell of the same primary public land mobile network (PLMN) where the csg-PhysCellIdRange was received. The 3 hour validity restriction may not apply to csg-PhysCellIdRange. The UE shall not apply any stored csg-PhysCellIdRange when the UE is in any cell selection state.

Hereinafter, closed subscriber group (CSG) is described.

CSG is defined as a set of UEs which are allowed to access to a specific cell. A cell with CSG indication set to 'TRUE' may be called 'CSG cell'. Only a specific set of UEs are allowed to access to the CSG cell. That is, CSG cell allows only UEs belonging to a specific CSG.

In contrast, non-CSG cell may be a cell on which any UEs are allowed to camp as long as the UEs have proper PLMN information and the cell is not barred.

The UE may receive an SIB1 from a cell. If the cell is a CSG cell, the SIB1 may comprise a CSG indication set to 'TRUE', and a CSG identity of the cell. If the UE identifies the CSG indication set to 'TRUE' in the SIB1, the UE may determine whether the CSG identity of the cell matches one of the CSG identities stored in the UE's CSG white list. If matching CSG identity exists, the UE determines that the UE is a member of the CSG cell, and report the CSG identity of the CSG cell and membership indication to a macro cell. Then, the macro cell may prepare a handover of the UE to the CSG cell.

Hereinafter, details of non-public network (NPN) are described.

An NPN is a 5GS deployed for non-public use An NPN may be deployed as:
  a Stand-alone Non-Public Network (SNPN), which may be operated by an NPN operator and may not rely on network functions provided by a PLMN, or
  a Public network integrated NPN, which may be a non-public network deployed with the support of a PLMN.

Interworking with EPS may not be supported for SNPN. Public network integrated NPNs can be enabled using network slicing.

Details of the SNPN and the public network integrated NPN are as the follows:

I. SNPN

1. Identifiers

The combination of a PLMN ID and network identifier (NID) identifies an SNPN. The PLMN ID used for SNPNs may not be required to be unique. PLMN IDs reserved for use by private networks can be used for non-public networks (e.g., based on mobile country code (MCC) 999 as assigned by ITU). Alternatively, a PLMN operator can use its own PLMN IDs for SNPN(s) along with NID(s), but registration in a PLMN and mobility between a PLMN and an SNPN may not be supported using an SNPN subscription given that the SNPNs are not relying on network functions provided by the PLMN.

The NID shall support two assignment models:
  Locally managed NIDs are assumed to be self-managed by SNPNs (i.e., chosen individually by SNPNs) at deployment time (and may therefore not be unique) but use a different numbering space than the universally managed NIDs.
  Universally managed NIDs are assumed to be globally unique.

An optional human-readable network name helps to identify an SNPN during manual SNPN selection.

2. Broadcast System Information

NG-RAN nodes which provide access to SNPNs may broadcast the following information:
  One or multiple PLMN IDs;
  List of NIDs per PLMN ID identifying the non-public networks NG-RAN provides access to; (It is assumed that an NG-RAN node supports broadcasting a total of twelve NIDs. The presence of a list of NIDs for a PLMN ID may indicate that the related PLMN ID and NIDs identify SNPNs)
  Optionally a human-readable network name per NID; (The human-readable network name per NID may only be used for manual SNPN selection); and/or
  Optional information to prevent UEs not supporting SNPNs from accessing the cell (e.g., in case the cell only provides access to non-public networks).

3. UE Configuration and Subscription Aspects

An SNPN-enabled UE may be configured with subscriber identifier (SUPI) and credentials for each subscribed SNPN identified by the combination of PLMN ID and NID.

A subscriber of an SNPN may be identified by a SUPI containing a network-specific identifier that takes the form of a Network Access Identifier (NAI) using the NAI RFC 7542 based user identification. The realm part of the NAI may include the NID of the SNPN.

An SNPN-enabled UE may support the SNPN access mode. When the UE is set to operate in SNPN access mode the UE may only select and register with SNPNs over Uu.

Emergency services may not be supported in SNPN access mode.

If a UE is not set to operate in SNPN access mode, even if it is SNPN-enabled, the UE does not select and register with SNPNs. A UE not set to operate in SNPN access mode may perform PLMN selection procedures. Details of activation and deactivation of SNPN access mode may be up to UE implementation.

4. Network Selection in SNPN Access Mode

When the UE is set to operate in SNPN access mode, the UE may not perform normal PLMN selection procedures.

UEs operating in SNPN access mode may read the available PLMN IDs and list of available NIDs from the broadcast system information and take them into account during network selection.

For automatic network selection, the UE may select and attempt to register with the available SNPN identified by a PLMN ID and NID for which the UE has SUPI and credentials. If multiple SNPNs are available that the UE has respective SUPI and credentials for, then the priority order for selecting and attempting to register with SNPNs may be based on UE implementation.

For manual network selection, UEs operating in SNPN access mode may provide to the user the list of NIDs and related human-readable names (if available) of the available SNPNs the UE has respective SUPI and credentials for.

When a UE performs Initial Registration to an SNPN, the UE shall indicate the selected NID and the corresponding PLMN ID to NG-RAN. NG-RAN shall inform the AMF of the selected PLMN ID and NID.

5. Network Access Control

If a UE performs the registration or service request procedure in an SNPN identified by a PLMN ID and a locally managed NID and there is no subscription for the UE, then the AMF shall reject the UE with an appropriate cause code to temporarily prevent the UE from automatically selecting and registering with the same SNPN.

If a UE performs the registration or service request procedure in an SNPN identified by a PLMN ID and a universally managed NID and there is no subscription for the UE, then the AMF shall reject the UE with an appropriate cause code to permanently prevent the UE from automatically selecting and registering with the same SNPN.

In order to prevent access to SNPNs for authorized UE(s) in case of network congestion/overload, Unified Access Control information may be configured per non-public network (i.e., as part of the subscription information that the UE has for a given non-public network).

6. Cell (Re-)Selection in SNPN Access Mode

UEs operating in SNPN access mode may only select cells and networks broadcasting both PLMN ID and NID of the selected SNPN.

II. Public Network Integrated NPN

Public network integrated NPNs are NPNs made available via PLMNs (e.g., by means of dedicated DNNs, or by one (or more) Network Slice instances allocated for the NPN). When an NPN is made available via a PLMN, then the UE has a subscription for the PLMN.

As network slicing does not enable the possibility to prevent UEs from trying to access the network in areas which the UE is not allowed to use the Network Slice allocated for the NPN, Closed Access Groups may optionally be used to apply access control.

A Closed Access Group may identify a group of subscribers who are permitted to access one or more CAG cells associated to the CAG.

CAG may be used for the Public network integrated NPNs to prevent UE(s), which are not allowed to access the NPN via the associated cell(s), from automatically selecting and accessing the associated cell(s).

CAG may be used for authorization at network/cell selection and configured in the subscription as part of the Mobility Restrictions (i.e., independent from any S-NSSAI). CAG may not be used as input to AMF selection nor Network Slice selection.

1. Identifiers

The following is required for identification:
A CAG is identified by a CAG Identifier which is unique within the scope of a PLMN ID;
A CAG cell broadcasts one or multiple CAG Identifiers per PLMN (It is assumed that an NG-RAN node supports broadcasting a total of twelve CAG Identifiers); and/or
A CAG cell may in addition broadcast a human-readable network name per CAG Identifier (The human-readable network name per CAG Identifier may only be used for presentation to user when user requests a manual CAG selection).

2. UE Configuration, Subscription Aspects and Storage

To support CAG, the UE may be pre-configured or (re)configured with the following CAG information, included in the subscription as part of the Mobility Restrictions:
an Allowed CAG list (i.e., a list of CAG Identifiers the UE is allowed to access); and/or
optionally, a CAG-only indication whether the UE is only allowed to access 5GS via CAG cells.

The HPLMN may configure or re-configure a UE with the above CAG information using the UE Configuration Update procedure for access and mobility management related parameters.

The above CAG information may be provided by the HPLMN on a per PLMN basis. In a PLMN the UE shall only consider the CAG information provided for this PLMN.

The UE shall store the latest available CAG information for every PLMN for which it is provided and keep it stored when the UE is de-registered. CAG information has no implication on whether and how the UE accesses 5GS over non-3GPP access.

3. Network and Cell (Re-)Selection, and Access Control

The following is assumed for network and cell selection, and access control:
The CAG cell shall broadcast information such that only UEs supporting CAG are accessing the cell (cells may be either CAG cells or normal PLMN cells);
In order to prevent access to NPNs for authorized UE(s) in case of network congestion/overload, existing mechanisms defined for Control Plane load control, congestion and overload control can be used, as well as the access control and barring functionality, or Unified Access Control using the access categories can be used.
For aspects of automatic and manual network selection in relation to CAG;
For aspects related to cell (re-)selection;
The Mobility Restrictions shall be able to restrict the UE's mobility according to the Allowed CAG list (if configured in the subscription) and include an indication whether the UE is only allowed to access CAG cells (if configured in the subscription);
During transition from CM-IDLE to CM-CONNECTED, if the UE is accessing the 5GS via a CAG cell, the UE shall provide the selected CAG Identifier to NG-RAN and the NG-RAN shall provide the CAG Identifier to the AMF. The AMF shall verify whether UE access is allowed by Mobility Restrictions. If the CAG Identifier received from the NG-RAN is part of the UE's Allowed CAG list, then the AMF accepts the NAS request; If the CAG Identifier received from the NG-RAN is not part of the UE's Allowed CAG list, then the AMF rejects the NAS request with an appropriate cause code, whereas the UE removes that CAG Identifier, if it exists, from its Allowed CAG list. The AMF shall then release the NAS signalling connection for the UE by triggering the AN release procedure; and if the UE is accessing the network via a non-CAG cell and the UE's subscription contains an indication that the UE is only allowed to access CAG cells, then the AMF rejects the NAS request with an appropriate cause code, whereas the UE updates its local configuration. The AMF shall then release the NAS signalling connection for the UE by triggering the AN release procedure.

During connected mode mobility procedures, based on the Mobility Restrictions received from the AMF:
1) Source NG-RAN shall not handover the UE to a target NG-RAN node if the target is a CAG cell and the related CAG Identifier is not part of the UE's Allowed CAG list; and
2) Source NG-RAN shall not handover the UE to a non-CAG cell if the UE is only allowed to access CAG cells;
When the AMF receives the Nudm_SDM_Notification from the UDM and the AMF determines that the Allowed CAG list or the indication whether the UE is only allowed to access CAG cells have changed:
1) The AMF shall update the Mobility Restrictions in the UE and NG-RAN accordingly; and
2) If the UE is currently accessing a CAG cell and the related CAG Identifier has been removed from the Allowed CAG list or if the UE is currently accessing a non-CAG cell and the indication that the UE is only allowed to access CAG cells has been set in the subscription, then the AMF shall release the NAS signalling connection for the UE by triggering the AN release procedure.

After UCU, the AMF may release the NAS signalling connection by triggering the AN release procedure to allow the UE to reselect a cell based on the updated Allowed CAG list and CAG-only indication, e.g., if the CAG Identifier of current cell is not part of the updated Allowed CAG list.

In LTE, if a UE provided with a list of CSG identities/identifiers (IDs) detects one or more suitable CSG cell on different frequencies, then the UE shall reselect to one of the detected CSG cells irrespective of the frequency priority of the cell the UE is currently camping on. While camping on a suitable CSG cell in normal coverage, the UE shall always consider the current frequency to be the highest priority frequency irrespective of any other priority value allocated to the current frequency. Therefore, if the UE is allowed to camp on a CSG cell and one or more CSG cells are detected, the UE can camp on the CSG cell more frequently than non-CSG cells.

In NR, non-public network was introduced to provide private network similarly with CSG. Identification information list provided by the network may affect the cell reselection or access to the cell by the UE. If the UE is using the Non-public network, the UE may set the cells with corresponding identification information as higher priority.

In NR, multi-beam operation has been adopted. Therefore, in intra-frequency and equal priority inter-frequency Cell Reselection Criteria as described above, if rangeToBestCell is configured, the UE shall perform cell reselection to the cell with the highest number of beams above the threshold (i.e., absThreshSS-BlocksConsolidation) among the cells whose R value is within rangeToBestCell of the R value of the highest ranked cell. If there are multiple such cells, the UE shall perform cell reselection to the highest ranked cell among them. Therefore, even if a cell is not the highest ranked cell in a frequency, the UE can perform cell reselection to the cell if the cell has highest number of beams above the threshold.

In some situations, the cells whose R value is within rangeToBestCell of the R value of the highest ranked cell may comprise one or more NPN cells. Therefore, it may be required for the UE to properly reselect an NPN cell among these cells.

Figure 10:
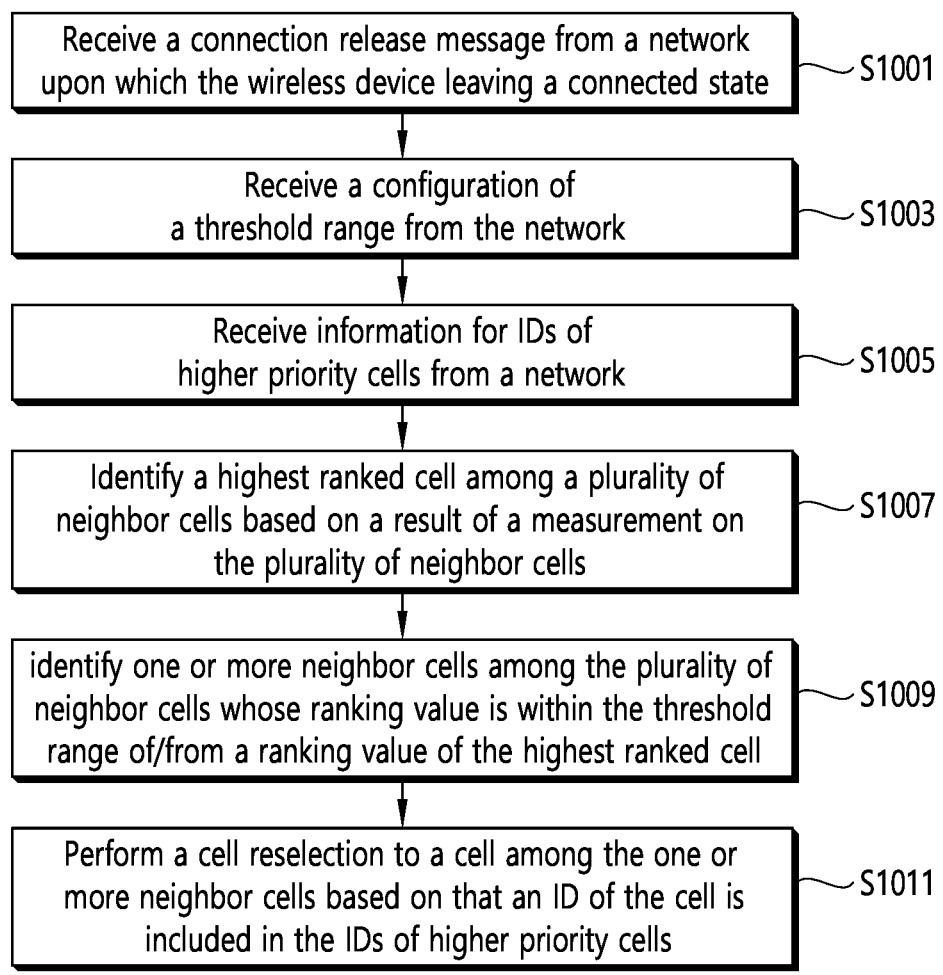
FIG. 10 shows an example of a method for performing a cell reselection to a cell among multiple cells including at least one higher priority cell according to an embodiment of the present disclosure.

FIG. 10 shows an example of a method for performing a cell reselection to a cell among multiple cells including at least one higher priority cell according to an embodiment of the present disclosure. Steps illustrated in FIG. 10 may be performed by a wireless device and/or a UE.

Referring to FIG. 10, in step S1001 the wireless device may receive a connection release message from a network upon which the wireless device leaving a connected state.

In step S1003, the wireless device may receive a configuration of a threshold range from the network.

In step S1005, the wireless device may receive information for IDs of higher priority cells from a network. The threshold range may comprise rangeToBestCell. The higher priority cells may comprise NPN cells, and the IDs of higher priority cells may comprise IDs of NPN cells.

In step S1007, the wireless device may identify a highest ranked cell among a plurality of neighbor cells based on a result of a measurement on the plurality of neighbor cells. The wireless device may perform a measurement on the plurality of neighbor cells, and may calculate a cell ranking (i.e., $R_n$) of each of the plurality of neighbor cells based on a result of the measurement on the plurality of neighbor cells. For example, the wireless device may calculate the $R_n$ based on the equation '$R_n = Q_{meas,n} - Qoffset - Qoffset_{temp}$', where the $Q_{meas,n}$ may be the result of the measurement.

Then, the wireless device may identify the highest ranked cell among the plurality of neighbor cells based on the cell ranking value $R_n$ of each neighbor cell.

In step S1009, the wireless device may identify one or more neighbor cells among the plurality of neighbor cells whose ranking value is within the threshold range of/from a ranking value of the highest ranked cell. The one or more neighbor cells may comprise multiple neighbor cells whose ranking value is within the threshold range of/from a ranking value of the highest ranked cell. The one or more neighbor cells may be referred to as best group cell(s), which is/are a member of the best cell group.

In step S1011, the wireless device may perform a cell reselection to a cell among the one or more neighbor cells based on that an ID of the cell is included in the IDs of higher priority cells. That is, if a cell among the one or more neighbor cells has an ID which belongs to the IDs of higher priority cells received from the network, the wireless device may identify that the cell is a higher priority cell (e.g., NPN cell), and perform a cell reselection to the higher priority cell.

According to various embodiments, the number of good beams of the reselected cell may be different from the number of good beams of a cell having the highest number of good beams among the one or more neighbor cells. That is, the number of good beams of the reselected cell may not be the highest among the one or more neighbor cells.

According to various embodiments, the good beams may comprise beams whose beam quality is above a threshold value (e.g., absThreshSS-Blocks Consolidation) configured by the network.

According to various embodiments, the number of good beams of the cell may be less than the number of good beams of the cell having the highest number of good beams.

According to various embodiments, the wireless device may perform a cell reselection to a cell whose ID is included in the IDs of higher priority cells regardless of the number of good beams of the cell. That is, even though the threshold range is configured, the wireless device may preferentially consider whether a cell is a higher priority cell and perform a cell reselection to the higher priority cell, rather than preferentially considering the number of good beams and performing a cell reselection to a cell having the highest number of good beams among the one or more neighbor cells within the threshold range. The reselected cell may or may not have the highest number of good beams among the one or more neighbor cells.

According to various embodiments, the cell may be the only cell among the one or more neighbor cells whose ID is included in the IDs of higher priority cells.

According to various embodiments, the wireless device may identify multiple cells whose ID is included in the IDs of higher priority cells among the one or more neighbor cells. The wireless device may select the cell among the multiple cells.

According to various embodiments, the cell may be selected such that the cell has a highest ranking among the multiple cells According to various embodiments, the cell may be selected such that the cell has a highest number of good beams among the multiple cells.

According to various embodiments, the cell may be selected such that the cell has a highest cell quality that is measured based on synchronization signal/physical broadcast channel (SS/PBCH) blocks of the cell.

According to various embodiments, the higher priority cells may comprise non-public network (NPN) cells.

According to various embodiments, a beam may comprise at least one of an SS/PBCH block (or, synchronization signal block (SSB)), or a channel state information reference signal (CSI-RS).

According to various embodiments, the wireless device may receive a list of higher priority cells. The wireless device may measure a quality of serving cell and neighbor cells. The wireless device may determine a best cell group of a frequency based on the measurement results. The wireless device may camp on a higher priority cell when the higher priority cell is included in the best cell group.

Figure 11:
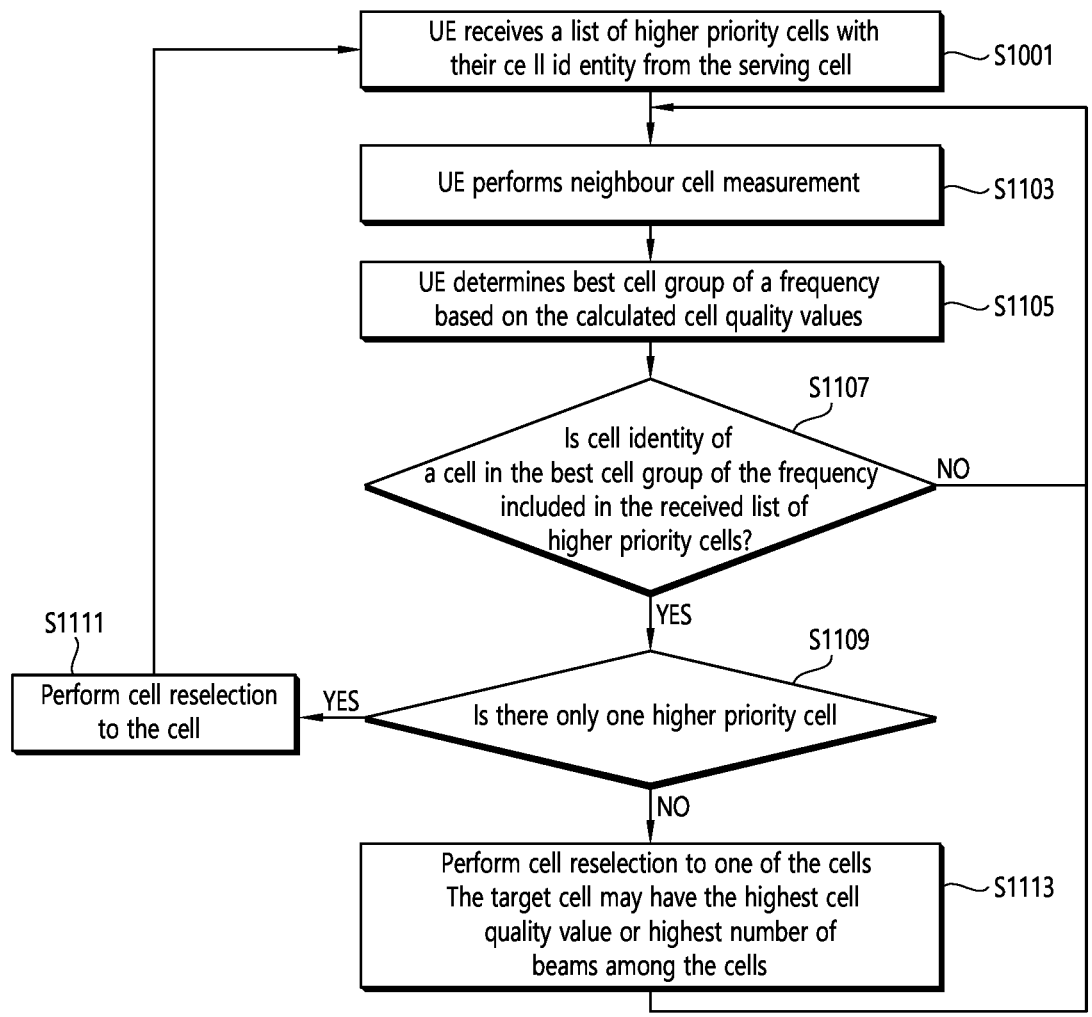
FIG. 11 shows an example of a method for preferentially reselecting a higher priority cell according to an embodiment of the present disclosure.

FIG. 11 shows an example of a method for preferentially reselecting a higher priority cell according to an embodiment of the present disclosure. Steps illustrated in FIG. 11 may be performed by a wireless device and/or a UE.

Referring to FIG. 11, in step S1101, the UE may receive a list of higher priority cells with their cell identity from the serving cell. The UE may receive information for a list of higher priority cells. The list of higher priority cells may include cell identity of each cell to distinguish the higher priority cell. The higher priority cells may be NPN cells. The list of higher priority cells may be provided by the network. The list of higher priority cells may be broadcast via system information. The list of higher priority cells may be provided via dedicated signalling.

In step S1103, the UE may perform a neighbour cell measurement. The measurement related information including cell(s) and frequency(-ies) may be provided by the network. The measurement related information may be broadcast via system information. The measurement related information may be provided via dedicated signalling.

In step S1105, the UE may determine the best cell group of a frequency based on the calculated cell quality values. The cell quality values may be calculated and derived by the neighbour cell measurement performed in step S1103.

To determine the best cell group, the UE may perform the following steps i) iii):

Step i) The UE may calculate a cell quality value of each cell in a frequency. The cell quality value may comprise at least one of an RSRP of each cell, R value of each cell, or S value of each cell. The S value may comprise at least one of Srxlev or Squal.

Step ii) The UE may identify a cell whose cell quality value is the highest among the cells in the frequency. This identified cell may be a member of the best cell group of the frequency.

Step iii) The UE may identify cells in the frequency whose cell quality value is within a threshold range from the cell quality value of the cell with the highest cell quality value. These identified cells may be a member of the best cell group of the frequency. The threshold range may be configured by the network. The threshold range may be rangeToBestCell.

In step S1107, the UE may determine whether a cell ID of a cell in the best cell group of the frequency is included in the list of higher priority cells received in step S1101. If a cell ID of a cell in the best cell group of the frequency is included in the list of higher priority cells, the UE may perform step S1109; otherwise, the UE may perform step S1103.

In step S1109, the UE may determine whether there is only one higher priority cell in the best cell group, or there are multiple number of higher priority cells in the best cell group. That is, the UE may determine whether there is a single cell in the best cell group whose cell ID is included in the list of higher priority cells, or there are multiple cells in the best cell group whose cell ID is included in the list of higher priority cells. If there is only one higher priority cell in the best cell group, the UE may perform step S1111; otherwise (i.e., there are multiple number of higher priority cells in the best cell group), the UE may perform step S1113.

In step S1111, the UE may perform cell reselection to a cell. When a specific neighbour cell is the member of the best cell group and cell ID of the specific neighbour cell is included in the list of higher priority cell received in step S1101, the UE may perform a cell reselection to the specific neighbour cell.

In step S1113, the UE may perform cell reselection to i) a higher priority cell having the highest cell quality value among the multiple higher priority cells, or ii) a higher priority cell having the highest number of good beams among the multiple higher priority cells.

Though not illustrated in FIG. 11, the steps performed by the UE as illustrated in FIG. 11 may further comprise a step in which the UE performs a connection release procedure with a RAN node (e.g., gNB). For example, this step may be performed prior to step S1101. While establishing a connection with the RAN node, the UE may perform a connection release procedure with a RAN node. The UE may receive an RRC release message from the RAN node. Upon receiving the RRC release message, the UE may enter RRC_IDLE and/or RRC_INACTIVE.

Figure 12:
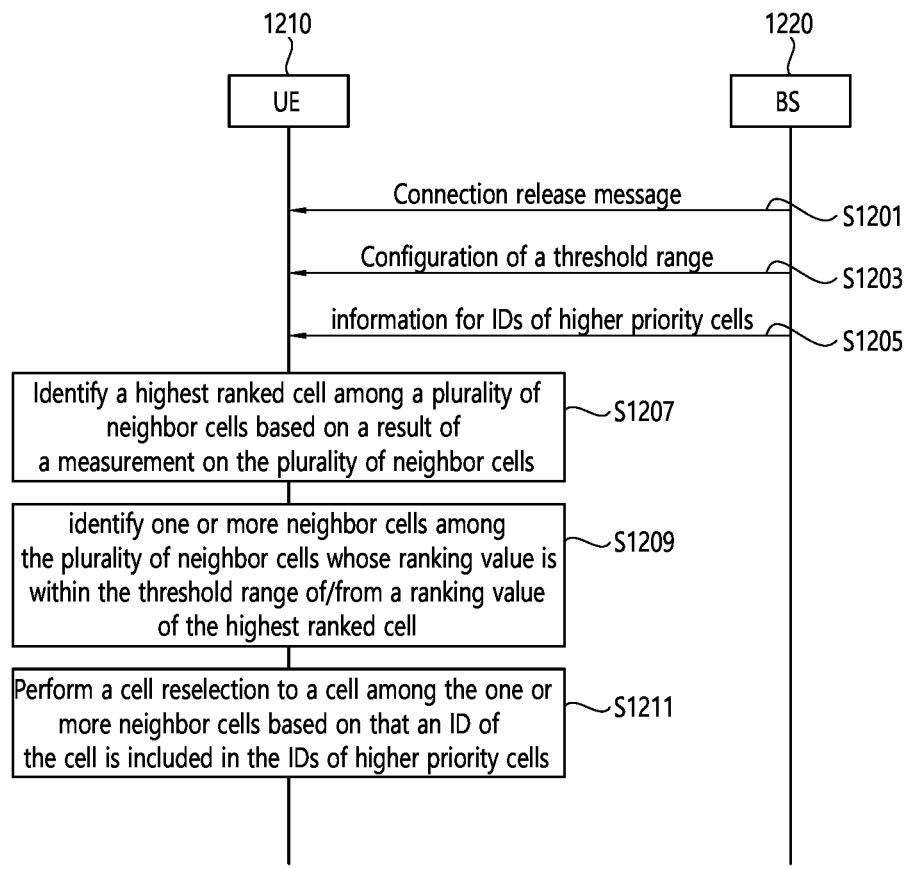
FIG. 12 shows an example of a signal flow for a cell reselection according to an embodiment of the present disclosure.

FIG. 12 shows an example of a signal flow for a cell reselection according to an embodiment of the present disclosure.

Referring to FIG. 12, in step S1201, the base station (BS) 1220 may transmit a connection release message to the UE 1210 upon which the UE 1210 leaving a connected state.

In step S1203, the BS 1220 may transmit a configuration of a threshold range to the UE 1210.

In step S1205, the BS 1220 may transmit, to the UE 1210, information for identities (IDs) of higher priority cells.

In step S1207, the UE 1210 may identify a highest ranked cell among a plurality of neighbor cells based on a result of a measurement on the plurality of neighbor cells.

In step S1209, the UE 1210 may identify one or more neighbor cells among the plurality of neighbor cells whose ranking value is within the threshold range of/from a ranking value of the highest ranked cell.

In step S1211, the UE 1210 may perform a cell reselection to a cell among the one or more neighbor cells based on that an ID of the cell is included in the IDs of higher priority cells.

The BS 1220 may be an example of a second device 220 in FIG. 2, and therefore, steps of the BS 1220 as illustrated in FIG. 12 may be implemented by the second device 220. For example, the processor 221 may be configured to control the transceiver 223 to transmit a connection release message to the UE 1210 upon which the UE 1210 leaving a connected state. The processor 221 may be configured to control the transceiver 223 to transmit a configuration of a threshold range to the UE 1210. The processor 221 may be configured to control the transceiver 223 to transmit, to the UE 1210, information for identities (IDs) of higher priority cells. The UE 1210 may identify a highest ranked cell among a plurality of neighbor cells based on a result of a measurement on the plurality of neighbor cells. The UE 1210 may identify one or more neighbor cells among the plurality of neighbor cells whose ranking value is within the threshold range of/from a ranking value of the highest ranked cell. The UE 1210 may perform a cell reselection to a cell among the one or more neighbor cells based on that an ID of the cell is included in the IDs of higher priority cells.

Figure 13:
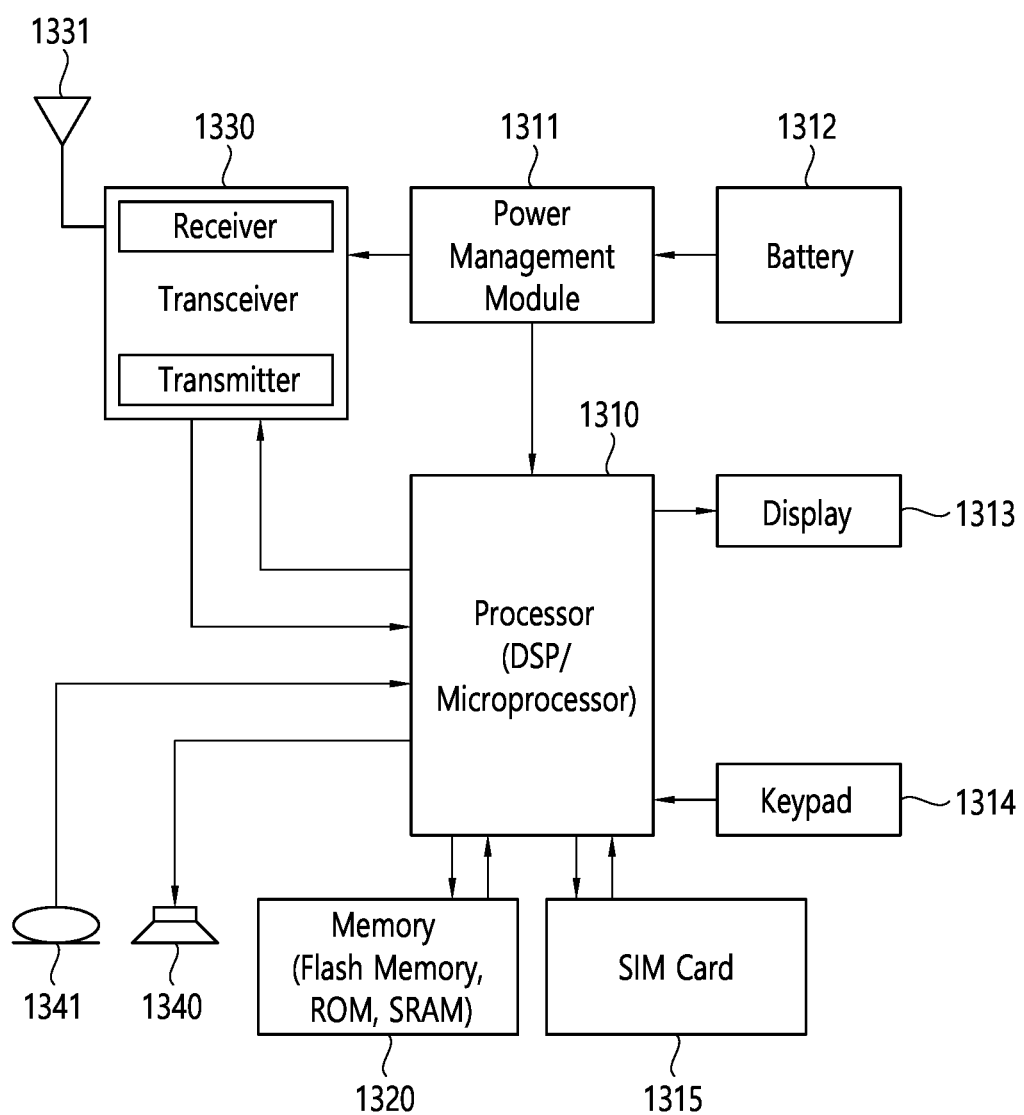
FIG. 13 shows a UE to implement an embodiment of the present disclosure.

FIG. 13 shows a UE to implement an embodiment of the present disclosure. The present disclosure described above for UE side may be applied to this embodiment. The UE in FIG. 13 may be an example of first device 210 as illustrated in FIG. 2.

A UE includes a processor 1310 (i.e., processor 211), a power management module 1311, a battery 1310, a display 1312, a keypad 1314, a subscriber identification module (SIM) card 1315, a memory 1320 (i.e., memory 212), a transceiver 1330 (i.e., transceiver 213), one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1311 manages power for the processor 1310 and/or the transceiver 1330. The battery 1310 supplies power to the power management module 1311. The display 1312 outputs results processed by the processor 1310. The keypad 1314 receives inputs to be used by the processor 1310. The keypad 1314 may be shown on the display 1312. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

According to various embodiments, the processor 1310 may be configured to, or configured to control the transceiver 1330 to implement steps performed by the UE and/or the wireless device throughout the disclosure. For example, the processor 1310 may be configured to control the transceiver 1330 to receive a connection release message from a network upon which the wireless device leaving a connected state. The processor 1310 may be configured to control the transceiver 1330 to receive a configuration of a threshold range from the network. The processor 1310 may be configured to control the transceiver 1330 to receive information for identities (IDs) of higher priority cells from a network. The processor 1310 may be configured to identify a highest ranked cell among a plurality of neighbor cells based on a result of a measurement on the plurality of neighbor cells. The processor 1310 may be configured to identify one or more neighbor cells among the plurality of neighbor cells whose ranking value is within the threshold range of/from a ranking value of the highest ranked cell. The processor 1310 may be configured to perform a cell reselection to a cell among the one or more neighbor cells based on that an ID of the cell is included in the IDs of higher priority cells.

According to various embodiments, a number of good beams of the cell may be different from a number of good beams of a cell having a highest number of good beams among the one or more neighbor cells.

According to various embodiments, the good beams may comprise beams whose beam quality is above a threshold value configured by the network.

According to various embodiments, the number of good beams of the cell may be less than the number of good beams of the cell having the highest number of good beams.

According to various embodiments, the processor 1310 may be further configured to perform the cell reselection to the cell whose ID is included in the IDs of higher priority cells regardless of a number of good beams of the cell.

According to various embodiments, the cell may be the only cell among the one or more neighbor cells whose ID is included in the IDs of higher priority cells.

According to various embodiments, the processor 1310 may be further configured to identify multiple cells whose ID is included in the IDs of higher priority cells among the one or more neighbor cells. The processor 1310 may be further configured to select the cell among the multiple cells.

According to various embodiments, the cell may be selected such that the cell has a highest ranking among the multiple cells.

According to various embodiments, the cell may be selected such that the cell has a highest number of good beams among the multiple cells.

According to various embodiments, the cell may be selected such that the cell has a highest cell quality that is measured based on synchronization signal/physical broadcast channel (SS/PBCH) blocks of the cell.

According to various embodiments, the higher priority cells may comprise non-public network (NPN) cells.

According to various embodiments, the processor 1310 may be further configured to perform the measurement on the plurality of neighbor cells. The processor 1310 may be further configured to calculate a ranking of each of the plurality of neighbor cells based on the result of the measurement. The processor 1310 may be further configured to identify the highest ranked cell based on the ranking of each of the plurality of neighbor cells.

Figure 14:
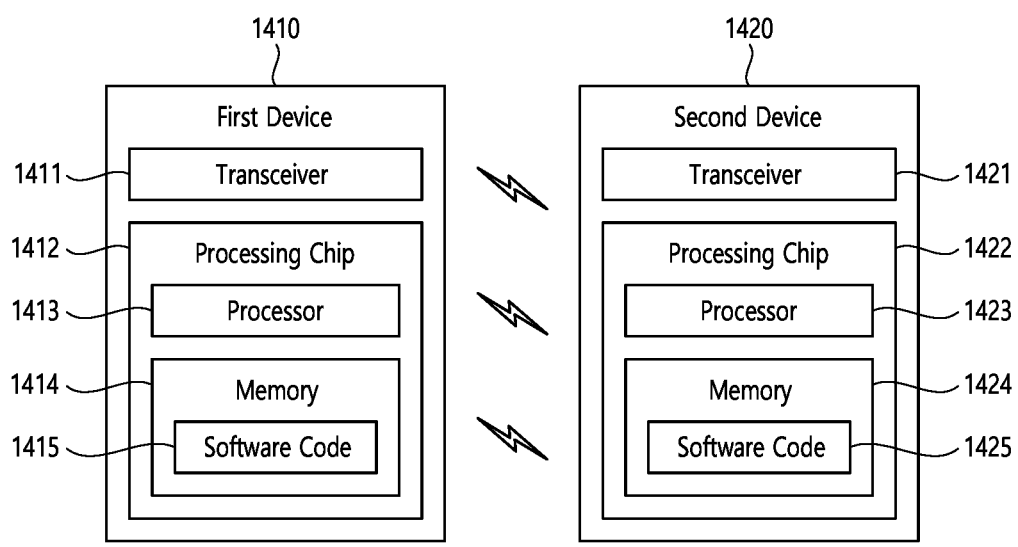
FIG. 14 shows another example of a wireless communication system to which the technical features of the present disclosure can be applied.

FIG. 14 shows another example of a wireless communication system to which the technical features of the present disclosure can be applied.

Referring to FIG. 14, the wireless communication system may include a first device 1410 (i.e., first device 210) and a second device 1420 (i.e., second device 220).

The first device 1410 may include at least one transceiver, such as a transceiver 1411, and at least one processing chip, such as a processing chip 1412. The processing chip 1412 may include at least one processor, such a processor 1413, and at least one memory, such as a memory 1414. The memory may be operably connectable to the processor 1413. The memory 1414 may store various types of information and/or instructions. The memory 1414 may store a software code 1415 which implements instructions that, when executed by the processor 1413, perform operations of the first device 910 described throughout the disclosure. For example, the software code 1415 may implement instructions that, when executed by the processor 1413, perform the functions, procedures, and/or methods of the first device 1410 described throughout the disclosure. For example, the software code 1415 may control the processor 1413 to perform one or more protocols. For example, the software code 1415 may control the processor 1413 to perform one or more layers of the radio interface protocol.

The second device 1420 may include at least one transceiver, such as a transceiver 1421, and at least one processing chip, such as a processing chip 1422. The processing chip 1422 may include at least one processor, such a processor 1423, and at least one memory, such as a memory 1424. The memory may be operably connectable to the processor 1423. The memory 1424 may store various types of information and/or instructions. The memory 1424 may store a software code 1425 which implements instructions that, when executed by the processor 1423, perform operations of the second device 1420 described throughout the disclosure. For example, the software code 1425 may implement instructions that, when executed by the processor 1423, perform the functions, procedures, and/or methods of the second device 1420 described throughout the disclosure. For example, the software code 1425 may control the processor 1423 to perform one or more protocols. For example, the software code 1425 may control the processor 1423 to perform one or more layers of the radio interface protocol.

According to various embodiments, the first device 1410 as illustrated in FIG. 14 may comprise a wireless device. The wireless device may comprise a transceiver 1411, a processing chip 1412. The processing chip may comprise a processor 1413, and a memory 1414. The memory 1414 may be operably connectable to the processor 1413. The memory 1414 may store various types of information and/or instructions. The memory 1414 may store a software code 1415 which implements instructions that, when executed by the processor 1413, perform operations comprising: receiving a connection release message from a network upon which the wireless device leaving a connected state; receiving a configuration of a threshold range from the network; receiving information for identities (IDs) of higher priority cells from the network; identifying a highest ranked cell among a plurality of neighbor cells based on a result of a measurement on the plurality of neighbor cells; identifying one or more neighbor cells among the plurality of neighbor cells whose ranking value is within the threshold range of/from a ranking value of the highest ranked cell; and performing a cell reselection to a cell among the one or more neighbor cells based on that an ID of the cell is included in the IDs of higher priority cells.

According to various embodiments, a computer-readable medium having recorded thereon a program for performing each step of a method on a computer is provided. The method comprises: receiving a connection release message from a network upon which the wireless device leaving a connected state; receiving a configuration of a threshold range from the network; receiving information for identities (IDs) of higher priority cells from the network; identifying a highest ranked cell among a plurality of neighbor cells based on a result of a measurement on the plurality of neighbor cells; identifying one or more neighbor cells among the plurality of neighbor cells whose ranking value is within the threshold range of/from a ranking value of the highest ranked cell; and performing a cell reselection to a cell among the one or more neighbor cells based on that an ID of the cell is included in the IDs of higher priority cells.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 15:
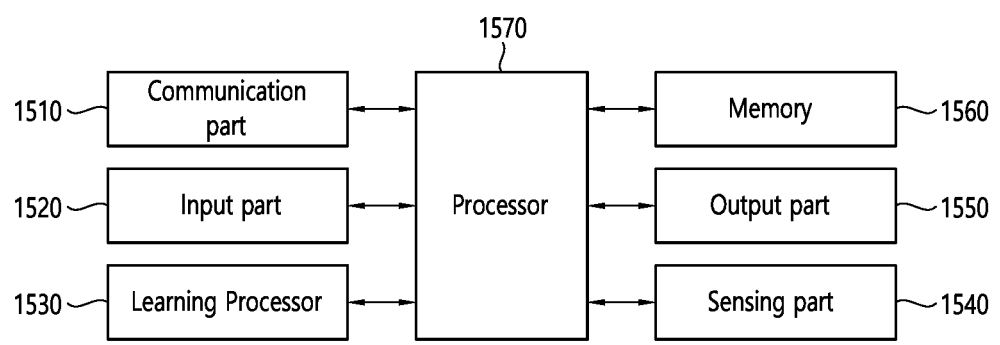
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1520, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1520 can acquire various kinds of data. The input part 1520 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1520 can acquire input data to be used when acquiring an output using learning data and a learning model for model learning. The input part 1520 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor 1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1520, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing. The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
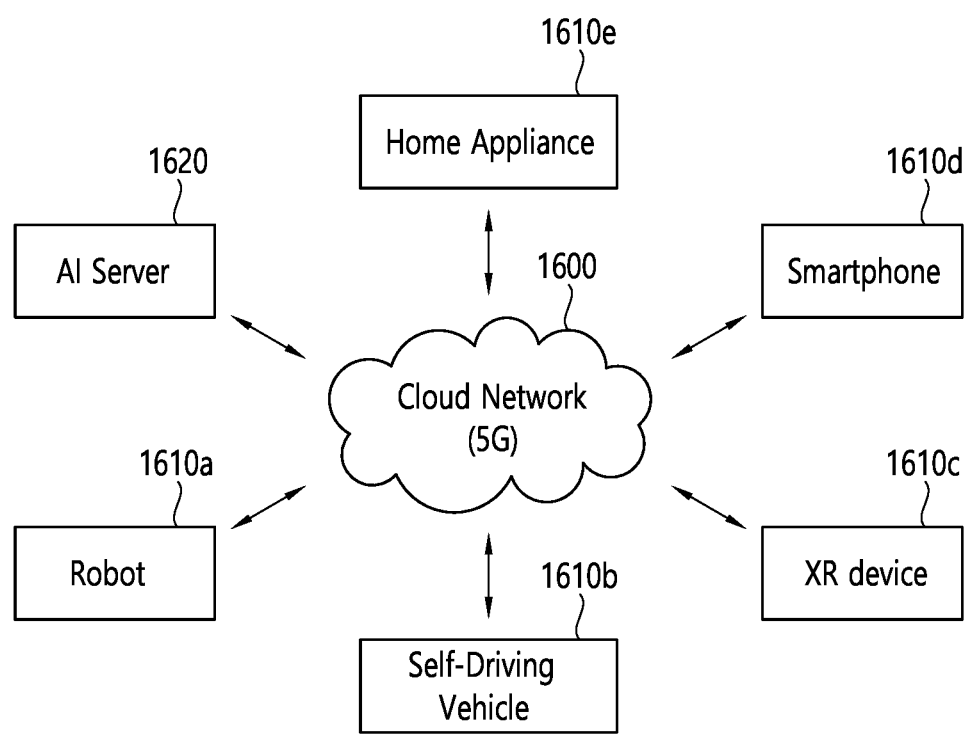
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610a, an autonomous vehicle 1610b, an XR device 1610c, a smartphone 1610d and/or a home appliance 1610e is connected to a cloud network 1600. The robot 1610a, the autonomous vehicle 1610b, the XR device 1610c, the smartphone 1610d, and/or the home appliance 1610e to which the AI technology is applied may be referred to as AI devices 1610a to 1610e.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610a to 1610e and 1620 consisting the AI system may be connected to each other through the cloud network 1600. In particular, each of the devices 1610a to 1610e and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e. the robot 1610a, the autonomous vehicle 1610b, the XR device 1610c, the smartphone 1610d and/or the home appliance 1610e through the cloud network 1600, and may assist at least some AI processing of the connected AI devices 1610a to 1610e. The AI server 1620 can learn the ANN according to the machine learning algorithm on behalf of the AI devices 1610a to 1610e, and can directly store the learning models and/or transmit them to the AI devices 1610a to 1610e. The AI server 1620 may receive the input data from the AI devices 1610a to 1610e, infer the result value with respect to the received input data using the learning model, generate a response and/or a control command based on the inferred result value, and transmit the generated data to the AI devices 1610a to 1610e. Alternatively, the AI devices 1610a to 1610e may directly infer a result value for the input data using a learning model, and generate a response and/or a control command based on the inferred result value.

Various embodiments of the AI devices 1610a to 1610e to which the technical features of the present disclosure can be applied will be described. The AI devices 1610a to 1610e shown in FIG. 16 can be seen as specific embodiments of the AI device 1500 shown in FIG. 15.

The present disclosure can have various advantageous effects.

For example, the wireless device may perform cell reselection to an NPN cell in multi-beam operation in idle/inactive mode, even if R value of the NPN cell is within a threshold range (i.e., rangeToBestCell) from the R value of the highest ranked cell but the number of beams above a threshold value (i.e., absThreshSS-BlocksConsolidation) for the NPN cell is not the highest.

For example, the UE can camp on the higher priority cell (e.g., NPN cell) among the cells in the best cell group of a frequency, even if the higher priority cell does not have the highest cell quality value or the highest number of good beams in the best cell group. The member of the best cell group may be determined by measured cell quality value of each cell. For example, the best cell group may comprise, among neighbour cells on which a measurement is performed, i) the highest ranked cell (i.e., the cell having the highest cell quality value), and ii) one or more neighbour cells whose cell quality value is within a configured threshold range (e.g., rangeToBestCell) from the cell quality value of the highest ranked cell. To distinguish the higher priority cell, the UE may compare the cell identity of a cell with the list of higher priority cells received from a network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   receiving a connection release message from a network upon which the wireless device leaving a connected state;
   receiving a configuration of a threshold range from the network;
   receiving information for identities (IDs) of higher priority cells from the network;
   identifying a highest ranked cell among a plurality of neighbor cells based on a result of a measurement on the plurality of neighbor cells;
   identifying one or more neighbor cells among the plurality of neighbor cells whose ranking value is within the threshold range of a ranking value of the highest ranked cell; and
   performing a cell reselection to a first cell among the one or more neighbor cells based on an ID of the first cell being included in the IDs of higher priority cells,
   wherein the method further comprises:
   performing the measurement on the plurality of neighbor cells; and
   calculating a ranking of each of the plurality of neighbor cells based on the result of the measurement,
   wherein the identifying of the highest ranked cell comprises identifying the highest ranked cell based on the ranking of each of the plurality of neighbor cells.

2. The method of claim 1, wherein a number of good beams of the first cell is different from a number of good beams of a second cell having a highest number of good beams among the one or more neighbor cells.

3. The method of claim 2, wherein the good beams comprise beams whose beam quality is above a threshold value configured by the network.

4. The method of claim 2, wherein the number of good beams of the first cell is less than the number of good beams of the second cell having the highest number of good beams.

5. The method of claim 1, wherein the performing of the cell reselection comprises performing the cell reselection to the first cell whose ID is included in the IDs of higher priority cells regardless of the number of good beams of the first cell.

6. The method of claim 1, wherein the first cell is an only cell among the one or more neighbor cells whose ID is included in the IDs of higher priority cells.

7. The method of claim 1, further comprising:
   identifying multiple cells whose ID is included in the IDs of higher priority cells among the one or more neighbor cells; and
   selecting the first cell among the multiple cells.

8. The method of claim 7, wherein the first cell is selected such that the first cell has a highest ranking among the multiple cells.

9. The method of claim 7, wherein the first cell is selected such that the first cell has a highest number of good beams among the multiple cells.

10. The method of claim 7, wherein the first cell is selected such that the first cell has a highest cell quality that is measured based on synchronization signal/physical broadcast channel (SS/PBCH) blocks of the first cell.

11. The method of claim 1, wherein the higher priority cells comprise non-public network (NPN) cells.

12. The method of claim 1, wherein the wireless device is in communication with at least one of a user equipment, a network, or autonomous vehicles other than the wireless device.

13. A wireless device in a wireless communication system comprising:
   a transceiver;
   a memory; and
   at least one processor operatively coupled to the transceiver and the memory,
   wherein the memory stores instructions that, based on being executed by the at least one processor, perform operations comprising:
   receiving a connection release message from a network upon which the wireless device leaving a connected state,
   receiving a configuration of a threshold range from the network,
   receiving information for identities (IDs) of higher priority cells from the network,
   identifying a highest ranked cell among a plurality of neighbor cells based on a result of a measurement on the plurality of neighbor cells,
   identifying one or more neighbor cells among the plurality of neighbor cells whose ranking value is within the threshold range of a ranking value of the highest ranked cell, and
   performing a cell reselection to a first cell among the one or more neighbor cells based on an ID of the first cell being included in the IDs of higher priority cells,
   wherein the operations further comprise:
   performing the measurement on the plurality of neighbor cells; and
   calculating a ranking of each of the plurality of neighbor cells based on the result of the measurement,
   wherein the identifying of the highest ranked cell comprises identifying the highest ranked cell based on the ranking of each of the plurality of neighbor cells.

14. A non-transitory computer-readable medium having recorded thereon a program for performing each step of a method on a computer, the method comprising:
   receiving a connection release message from a network upon which the wireless device leaving a connected state;
   receiving a configuration of a threshold range from the network;
   receiving information for identities (IDs) of higher priority cells from the network;
   identifying a highest ranked cell among a plurality of neighbor cells based on a result of a measurement on the plurality of neighbor cells;
   identifying one or more neighbor cells among the plurality of neighbor cells whose ranking value is within the threshold range of a ranking value of the highest ranked cell; and
   performing a cell reselection to a first cell among the one or more neighbor cells based on an ID of the first cell being included in the IDs of higher priority cells,
   wherein the method further comprises:
   performing the measurement on the plurality of neighbor cells; and
   calculating a ranking of each of the plurality of neighbor cells based on the result of the measurement,
   wherein the identifying of the highest ranked cell comprises identifying the highest ranked cell based on the ranking of each of the plurality of neighbor cells.

* * * * *